United States Patent [19]

Tucker

[11] 4,308,177

[45] Dec. 29, 1981

[54] USE OF CHLORO-HYDROCARBONS TO PRODUCE HIGH DENSITY ELECTRODES

[75] Inventor: Kenneth W. Tucker, Elizabethton, Tenn.

[73] Assignee: Great Lakes Carbon Corporation, New York, N.Y.

[21] Appl. No.: 69,846

[22] Filed: Aug. 27, 1979

[51] Int. Cl.³ .............................................. H01B 1/06
[52] U.S. Cl. .................................... 252/507; 252/506; 252/508; 252/509; 252/510; 13/18 R; 264/29.1; 264/29.7; 264/105; 106/284; 204/294
[58] Field of Search ............... 252/506, 507, 508, 509, 252/510, 421; 13/18 R; 204/294; 106/278, 279, 281 R, 284; 264/104, 105, 29.1, 29.5, 29.7; 428/244, 902; 314/60

[56] References Cited

U.S. PATENT DOCUMENTS

| | | | |
|---|---|---|---|
| 2,270,181 | 1/1942 | Cole et al. | 106/284 |
| 2,270,199 | 1/1942 | Thrune | 106/56 |
| 2,500,208 | 3/1950 | Shea | 106/284 |
| 2,500,209 | 3/1950 | Shea | 18/547 |
| 3,658,476 | 4/1972 | Trask | 23/209 |
| 4,160,747 | 7/1979 | Scheider et al. | 252/506 |
| 4,188,279 | 2/1980 | Van | 252/508 |
| 4,243,833 | 1/1981 | Suga | 13/18 R |

*Primary Examiner*—J. L. Barr
*Attorney, Agent, or Firm*—Adrian J. Good

[57] ABSTRACT

Chloro-hydrocarbons are used as pitch binder modifiers to improve the strength, density and electrical properties of carbon and graphite articles produced from carbonaceous particles, binders, and additives, and are particularly useful in manufacture of electrodes used in ultra high powered electric arc steel furnaces.

9 Claims, No Drawings

USE OF CHLORO-HYDROCARBONS TO PRODUCE HIGH DENSITY ELECTRODES

BACKGROUND OF THE INVENTION

Graphite electrodes used in ultra-high powered electric steel furnaces are usually manufactured from petroleum coke having a low coefficient of thermal expansion characteristic and which is usually termed needle coke. The coke is calcined, crushed to size, screened, with various particle sizes being incorporated into a blend with a pitch binder, mixed, extruded, baked, the temperature rising to an intermediate temperature of approximately 800°–900° C., and graphitized at a temperature of approximately 2000° to 3000° C.

All of the above is a complex industrial process consuming many months of time and taking a high degree of skill and technology to produce a satisfactory end product.

The requirements for these graphite electrodes are such that only the most rigid attention to detail in both manufacturing and raw materials will ensure that the final product meets all the performance specifications of the users.

Electrodes used for the electrolysis of alumina in a fused cryolite bath in the Hall-Heroult process are made of a wide variety of carbonaceous particles, including calcined petroleum coke, calcined anthracite, graphite and pitch coke. Anodes may be of either the pre-baked, or the Soderberg type which is baked in situ from the mix of carbon particles and binder. Cathodes for Hall cells often have calcined anthracite and graphite particles as components of the production mix.

Electrodes for other types of cells are often made of various grades of carbon and graphite mixtures, with their design taking into account the electrical, chemical, and mechanical properties needed at a cost commensurate with these properties.

Needle coke is a commercial grade of code having an acicular, anisotropic microstructure, see U.S. Pat. No. 2,775,549 to Shea, Dec. 25, 1956, Cl. 201-42, made by delayed coking of certain petroleum residues under specific conditions of heat and pressure. After coking it is calcined at approximately 1200°–1500° C. To produce graphite from such coke, it is necessary to heat it to a temperature in the range of 2000°–3000° C., which has the dual function of supplying energy for the conversion of the carbon in the coke to the graphitic crystalline form and of volatilizing impurities. When carbon bodies made from such cokes are heated at temperatures in the vicinity of 1000°–2000° C., various sulfur-containing compounds decompose, attended by a rapid and irreversible expansion of the carbon body. This phenomenon is termed "puffing". During the production of graphite articles, particularly high performance graphite electrodes, puffing is extremely undesirable as it may destroy the structural integrity of the piece and render it marginal or useless for its intended purpose.

Puffing has been avoided in the past by using coke made from petroleum residues low in sulfur content. This approach is of only limited utility at present since the principal petroleum crudes currently in use have high sulfur contents, and the cokes made from their residues will normally exhibit an undesirable degree of puffing.

Another approach to elimination or alleviation of the puffing problem in manufacture of graphite articles has been by the use of additives. These additives have usually been added during the mixing stage when various sizes and grades of coke particles are mixed, before being wetted with pitch, formed into the desired shape, baked at an intermediate temperature and graphitized at high temperatures.

During operation of electric arc steel furnaces, the electrodes are subject to mechanical, chemical and electrical stresses of such severity that, particularly for the ultra high powered furnaces, only graphite of very high quality in both strength and electrical resistance, with a low coefficient of thermal expansion can be used. The electrode sections are joined by nipples, generally bifrustroconical in shape, which fit into threaded matching sockets in the electrode ends, the joints being the most critical areas for both mechanical and electrical stresses. An electrode with a poor modulus of rupture will generally fail by breaking at the joint, due to mechanical shocks from charging the furnace and operation in this rough environment. An electrode with high electrical resistance will overheat at the joint, causing the socket to split from the induced thermal expansion. A low coefficient of thermal expansion is necessry to prevent splitting of the electrode sockets during operation at the temperature of the electric arc furnace.

The petroleum based needle cokes used in the highest quality ultra high powered electrodes for electric steel furnaces have CTE values below $5 \times 10^{-7}$ cm/cm/° C. over the range of 0° to 50° C. Less critical applications may use needle cokes of as much as $10 \times 10^{-7}$ cm/cm/° C. Non-needle cokes used in other applications may have CTE values of as much as $50 \times 10^{-7}$ cm/cm/° C.

To produce carbon and graphite electrodes, and other articles, with good performance in all of the above respects, it is necessary that suitable binders be used, which will carbonize on heating to 800°–900° C. to a dense, strong matrix holding the carbonaceous particles, and that the whole then be capable of conversion to a homogeneous graphite on heating to 2000° to 3000° C. in the instances where the end product is graphite.

Many additives of various types have been and are being used to improve properties of the end product, whether carbon baked to 800°–900° C., or converted to graphite. Catalysts are used to promote polymerization and cross-linking of pitches and thermosetting resin binders. Metal salts and oxides of iron, chromium, copper, manganese, calcium, aluminum and titanium, and the alkaline earth fluorides in amounts of 0.1 to 5% are used to control puffing. Waxes and low melting solids are used as plasticizers and extrusion die lubricants. Surface active agents are used to promote wetting of the coke by binders.

Chlorinated materials have been used as additives to lower puffing, improve the yield on coking of the pitch binder, strengthen the end product, i.e. to give one with a higher modulus of tensile strength, lower the coefficient of thermal expansion, and act as a mix plasticizer.

In the past chlorinated compounds have been used according to the disclosure of British Pat. No. 1,163,994 to Trask et al., U.S. Pat. No. 2,500,209 to Shea, and U.S. Pat. No. 3,658,476 to Trask. These disclose the use of polychlorinated polyphenyls and other chlorinated compounds as additives to increase the strength, lower the coefficient of thermal expansion, and lower the puffing of the electrodes on graphitization.

The use of chlorinated compounds in graphite articles has not been widely accepted due to several difficulties, the chief of which has been that these compounds, particularly chlorinated aliphatic materials, are unstable at temperatures well below those normally used to mix and process graphite electrodes and other carbonaceous articles bonded with pitches.

The usual method of fabrication of graphite and carbon articles includes the grinding of the various grades of petroleum coke or coke made from coal and coal tar residues, and sorting by size of the various particles, followed by combination of specified quantities of each size of particles, and optionally other fillers such as graphite aggregate or pre-graphitized coke, mixing with a petroleum or coal tar pitch or other binder such as phenolic and furfural resins and lignosulfonates, at the temperature above the melting point of the pitch when pitch is used, (which may vary from 70° C.–180° C.) and blending in a high shear mixer.

The phenolic resins used are the well-known phenol-aldehyde condensation products using as raw materials phenol and its homologues, reacted with an aldehyde, generally formaldehyde, or its homologues such as benzaldehyde. Furfural resins used include those derived from furfural alcohol and furfuraldehyde. All of these may be used in blends with catalysts, accelerators and reactants of many types. The principal requirements for a binder are that it bond the particles firmly together through the baking process and that it have a high carbon residue on heating to the baking temperature of 800°–900° C. range. Those mentioned are the most practical in meeting both performance and cost characteristics necessary in manufacturing high performance materials at competitive costs.

In the case of electrodes this mix is then extruded, baked, the temperature rising continuously to approximately 800° to 900° C. and graphitized to temperatures of approximately 2500° to 2800° C.

Most chlorinated compounds, including chlorinated paraffins, chlorinated benzene, and lower chlorinated derivatives of polyaromatic compounds, are unstable, particularly in the presence of pitches, at the normal mixing temperatures of 150° C. and higher.

These chlorinated materials may decompose by several mechanisms, one of which is dehydrochlorination, in which an atom of chlorine is ejected from the molecule and then extracts an atom of hydrogen from the same molecule or from another available molecule to form hydrogen chloride, an extremely reactive polymerization catalyst at these temperatures. Catalysis by HCl may be so rapid and uncontrollable as to cause inhomogeneous cure, with gas fissures, split pieces, and incomplete polymerization in some areas, and brittle cures in other areas. Extrusions may "set up" in the extrusion press or the blend of particles and binder in the mixer due to this premature reaction with almost any chlorinated material. This has made chlorinated compounds highly impractical, if not impossible to use, since they usually become polymerized by condensation to the extent that extrusion is difficult due to the increase in viscosity.

SUMMARY OF THE INVENTION

I have found that the higher chlorinated derivatives of naphthalene are useful as condensation polymerization catalysts for the pitch binders used in manufacture of graphite articles. At the temperatures involved in mixing the carbon particles and liquid pitch binder, these compounds have been found to be much more stable chemically and thermally than the compounds mentioned in the prior art, and thus much less liable to react in an uncontrollable fashion than the materials previously used. In general the tetra- through the octa-chlorinated naphthalene compounds exhibit the desirable properties of a reasonably high melting point, good lubricity at the working temperatures needed, good stability at the lower temperatures involved in mixing coke binder mixes, and exhibit controllable reactivity at the higher temperatures involved in baking moldings and extrusions formed from these mixes.

These materials have the following advantages as compared with those previously known and used: (1) they are less toxic than many other prior art compounds, particularly the chlorinated polyphenyls and biphenyls; (2) the mix is much more stable before baking and does not display the uncontrolled reactivity of the compounds mentioned above, especially during mixing; (3) the chlorinated naphthalenes lubricate the mix and allow a consequent lowering of die pressures with smoother extrusions; (4) at baking temperatures the reactions of polycondensation of the pitches are accelerated allowing shorter baking times; (5) strengths, particularly the modulus of rupture, and density are improved; (6) they function as puffing inhibitors, in particular acting synergistically with iron oxide and other metallic compounds including the alkaline earth fluorides and the oxides of chromium, copper, cobalt, and manganese in producing electrodes with much lower puffing levels than can be obtained with quantities of each of the individual components.

One possible explanation for the improved reactivity profile of the chloronaphthalenes is the fact that these compounds have little or no available hydrogen and consequently react to a limited extent or not at all by the internal dehydrochlorination mechanism. Octachloronaphthalene has no hydrogen, cannot react by the internal dehydro-chlorination reaction, and any liberated chlorine must react with hydrogen extracted from the binder to form HCl.

From 0.25 to 5 weight percent of highly chlorinated naphthalenes are added to electrode or nipple stock in the mixing cycle prior to extrusion to promote condensation reactions in the binder during subsequent baking, thus improving coke yield of the binder with accompanying increase in density and strength in the subsequently graphitized piece. Additionally, the method increases microporosity of the piece, thus lowering the coefficient of thermal expansion.

Outstanding puffing control has also been achieved in experiments involving ultra high powered electrodes formulated with a typical high puffing coke using a combination of iron oxide, (a conventional inhibitor), and polychlorinated naphthalene. When about 0.8% iron oxide is utilized in combination with 0.8 to 1.2% of a highly chlorinated naphthalene such as tetra-, penta-, or octa-chloronaphthalene, puffing is almost eliminated in the primary puffing region, in the neighborhood of 1500° C.

The degree of puffing measured in a dynamic puffing test in ultra high powered electrode formulations with chlorinated naphthalene-iron oxide combination is only 10% as high as formulations without the chlorinated naphthalene. Electrode formulations containing chloronaphthalene and iron oxide exhibit superior puffing control in the primary puffing region over model systems containing up to two to three percent iron oxide, calcium fluoride and titanium dioxide in their most advantageous combinations.

Carbonaceous articles so made may be used as electrodes in electro-chemical cells and electric arc steel furnaces, and wherever a grade of carbon or graphite with improved properties is advantageous, as for example as anodes and cathodes in Hall and other electrolytic cells, as nuclear grahite, crucibles, chemical reactors, high temperature apparatus, and the like.

DESCRIPTION OF THE INVENTION

Approximately 0.25 to 5 parts per 100 of chlorinated naphthalenes are used in the mix according to the examples shown below:

EXAMPLE 1

1 part per 100 octachloronaphthalene was added to a mix of medium grade of fineness of coke particles bonded with coal tar pitch, carbonized at a temperature rising to approximately 800° C., then graphitized at approximately 2500° to 2800° C.:

|  | Control | Octa-chloronaphthalene |
|---|---|---|
| AD g/cc | 1.56 | 1.61 |
| ER ohm-in × $10^{-5}$ | 35.3 | 32.7 |
| MOR psi | 1450 | 1700 |
| MOE psi × $10^6$ | 1.14 | 1.31 |
| CTE cm/cm/°C. × $10^{-7}$ | 6.9 | 6.8 |

In all of the figures given AD is apparent density in grams per cc; ER is an index of electrical resistivity, with results designated in ohm-in × $10^{-5}$; MOR is modulus of rupture in psi, MOE is modulus of elasticity in psi × $10^6$, CTE is coefficient of thermal expansion in cm/cm × $10^{-7}$/° C. over 0°-50° C., and chloronaphthalene may be abbreviated as C.N. Puffing is measured as the increase in length over the range of 1200°-2900° C.

It should be noted that the mix using the octachloronaphthalene was superior in all parameters in this example.

In checking the environmental conditions associated with the polychloronaphthalene, no detectable chlorine or HCl emissions were found during mixing or extrusion, by the use of an electronic sniffer. Studies show that at a baking temperature of 750° C., a significant portion of the chlorine is retained and then emitted during graphitization.

EXAMPLE 2

A blend of petroleum needle coke with a CTE characteristic less than $5 \times 10^{-7}$ cm/cm/° C. over the range of 0° to 50° C., with coal tar pitch, used for manufacture of ultra high powered arc furnace electrodes and other graphite products, was modified with 1, 2, and 3 pph of a commercial tetra-penta chloronaphthalene blend, baked, graphitized, and tested as follows:

| Extrusion | Control A | B | C | D |
|---|---|---|---|---|
| pph chloronaphthalene | 0 | 1 | 2 | 3 |
| Extrusion lubricant pph |  |  | 0.5 |  |
| AD g/cc Green | 1.735 | 1.742 | 1.737 | 1.759 |
| AD g/cc Baked | 1.648 | 1.694 | 1.687 | 1.704 |
| AD g/cc Graphitized | 1.607 | 1.657 | 1.651 | 1.655 |
| Wt change-Green-baked % | −5.6 | −3.8 | −4.1 | −4.4 |
| Wt change-graphitized % | −2.8 | −3.3 | −3.3 | −3.4 |
| Vol. change-Green-baked % | −0.6 | −1.1 | −1.3 | −1.3 |
| Vol. change-graphitized % | −0.3 | −0.7 | −0.9 | −0.9 |
| AD g/cc | 1.60 | 1.64 | 1.63 | 1.65 |
| ER ohm-in × $10^{-5}$ | 36.9 | 30.8 | 34.6 | 34.6 |
| MOR psi | 1050 | 1200 | 1300 | 1270 |
| MOE psi × $10^6$ | 0.98 | 1.08 | 1.07 | 1.05 |
| CTE, cm/cm/°C. × $10^{-7}$ | 5.2 | 4.7 | 5.5 | 5.6 |

The above examples showed an increase in apparent density in the baked form and in the graphitized end product, which is favorable. Of the other properties electrical resistivity showed a slight decrease, modulus of rupture was increased, the modulus of elasticity was increased and the coefficient of thermal expansion was also slightly increased for "C" and "D". Of the above all parameters are favorable except for the slight increase in the coefficient of thermal expansion. With the use of 1 part per 100, however, the coefficient of thermal expansion of "B" was more favorable than for the control or than with 2 or 3 pph chloronaphthalene, showing that for some applications, 1 pph is an optimum ratio.

EXAMPLE 3

The extrusion C from the Example 2 was impregnated with petroleum pitch after baking, then rebaked and graphitized, with results as shown:

| Extrusion | Control | C |
|---|---|---|
| AD g/cc Green | 1.74 | 1.737 |
| AD g/cc Baked | 1.64 | 1.687 |
| AD g/cc Rebaked | 1.70 | 1.742 |
| AD g/cc Graphitized | 1.67 | 1.710 |
| Wt. gain on impregnation, % | 10.4 | 8.9 |
| Coke yield, % on impregnant | 30.6 | 34.3 |
| Wt. change, % Baked-rebaked | +3.2 | +3.0 |
| Graphitized | −3.2 | −3.3 |
| Vol. change, % Baked-rebaked | −0.6 | −0.3 |
| Graphitized | −1.5 | −1.3 |
| AD g/cc | 1.65 | 1.70 |
| ER ohm-in × $10^{-5}$ | 26.9 | 27.0 |
| MOR psi | 1580 | 1820 |
| MOE psi × $10^6$ | 1.43 | 1.47 |
| CTE cm/cm/°C. × $10^{-7}$ | 6.2 | 5.8 |

The most notable changes in this test were a 15% increase in the modulus of rupture, an 0.05 g/cc increase in A.D., making the graphite less porous, less susceptible to oxidation, and a much stronger material than the control. A higher coking yield on the impregnant is advantageous, giving a product of greater density and less porosity.

EXAMPLE 4

In this test, tri-tetrachloronaphthalene mixture was used as the additive:

| Extrusion | D | E | F | G |
|---|---|---|---|---|
| Additive-T.T.C.N.[1] pph | none | 1.0 | 2.0 | 2.0 |
| AD - Green | 1.728 | 1.716 | 1.760 | 1.760 |
| AD - Baked | 1.654 | 1.668 | 1.680 | 1.696 |
| AD - Graphitized | 1.613 | 1.614 | 1.623 | 1.643 |
| % wt. change green-baked | −5.1 | −4.3 | −5.0 | −4.5 |
| graphitized | −3.3 | −3.8 | −3.6 | −3.5 |
| % vol. change green-baked | −0.4 | −1.3 | −0.5 | −0.9 |
| graphitized | −0.9 | −0.6 | −0.6 | −0.5 |

-continued

| Extrusion | D | E | F | G |
|---|---|---|---|---|
| AD g/cc | 1.60 | 1.61 | 1.63 | 1.64 |
| ER ohm-in × $10^{-5}$ | 36.3 | 34.6 | 35.1 | 33.3 |
| MOR psi | 1100 | 1070 | 1290 | 1190 |
| MOE × $10^6$, psi | 1.07 | 1.00 | 1.06 | 1.10 |
| CTE cm/cm/°C. × $10^7$ | 5.1 | 5.4 | 4.9 | 4.9 |

1-Commercial grade of mixed tri- and tetrachloronaphthalene

This trial showed that the tri-tetrachloronaphthalene mixture was not as effective an additive, when compared to the higher chlorinated derivatives shown in the previous examples, but did give improved properties as compared to the control.

One effect noted in evaluating these materials is that by accelerating the polymerization reactions of the binder pitch, the amount of pitch vaporized is decreased, resulting in lower air pollution in the working area, and in higher coke yields based on the binder used in the order of 6 to 7%.

EXAMPLE 5

A trial was made using 1.0 pph of octachloronaphthalene, in a standard electrode mix.

| Extrusion | H | I | J |
|---|---|---|---|
| Octachloronaphthalene | 1.0 pph. | 1.0 pph. | CONTROL |
| AD - Green | 1.754 | 1.738 | 1.728 |
| AD - Baked | 1.685 | 1.688 | 1.647 |
| AD - Graphitized | 1.656 | 1.651 | 1.613 |
| Wt. change, % | | | |
| Green-Baked | −4.3 | −3.7 | −5.1 |
| Graphitized | −3.1 | −3.4 | −3.3 |
| Vol. change, % | | | |
| Green-Baked | −0.4 | −0.9 | −0.4 |
| Graphitized | −1.7 | −1.4 | −0.9 |
| AD g/cc | 1.65 | 1.63 | 1.60 |
| ER ohm-in × $10^{-5}$ | 32.1 | 31.7 | 36.3 |
| MOR psi | 1450 | 1200 | 1100 |
| MOE psi × $10^6$ | 1.24 | 1.14 | 1.07 |
| CTE cm/cm/°C. × $10^{-7}$ | 5.3 | 4.0 | 5.1 |

A lower electrical resistivity, higher moduli and density are apparent in this instance, with the CTE showing no definite trend.

EXAMPLE 6

A trial run using 1 pph $Fe_2O_3$ and 1–1.5 pph chloronaphthlene in a standard coke-binder mix, was made to evaluate the utility of this additive system as a puffing inhibitor.

| Extrusion | K | L | M | N |
|---|---|---|---|---|
| Inhibitor | 1.0 $Fe_2O_3$ | 2.0 $Fe_2O_3$ | 1.0 $Fe_2O_3$ 1.0 TPCN | 1.0 $Fe_2O_3$ 0.75 TPCN[1] 0.75 OCN[2] |
| AD g/cc Green | 1.744 | 1.740 | 1.738 | 1.734 |
| AD g/cc Baked | 1.656 | 1.664 | 1.671 | 1.675 |
| AD g/cc Graphitized | 1.612 | 1.616 | 1.637 | 1.646 |
| Wt. change, % | | | | |
| Green-Baked | −5.5 | −5.2 | −4.4 | −4.1 |
| Graphitized | −3.3 | −3.7 | −3.3 | −3.5 |
| Vol. change, % | | | | |
| Green-Baked | −0.5 | −0.9 | −0.5 | −0.7 |
| Graphitized | −0.9 | −1.2 | −1.0 | −1.4 |
| AD g/cc | 1.61 | 1.60 | 1.63 | 1.62 |
| ER ohm-in × $10^{-5}$ | 35.6 | 37.2 | 34.6 | 35.5 |
| MOR psi | 1140 | 1070 | 1220 | 1230 |
| MOE psi × $10^6$ | 1.07 | 0.97 | 1.10 | 1.09 |
| CTE cm/cm × $10^{-7}$/°C. | 4.7 | 4.9 | 4.8 | 5.2 |
| Dynamic Puffing % ΔL | 0.92 | 0.47 | 0.09 | 0.15 |

[1]Tetra-pentachloronaphthalene
[2]Octachloronaphthalene

Results with the two test pieces containing 1.00 pph of the tetra-pentachloronaphthalene, and the piece containing 0.75 each of the tetra-pentachloronaphthalene, and octachloronaphthalene show less dynamic puffing than those with 1 or 2 pph $Fe_2O_3$. This effect was not merely additive but showed a synergism due to the use of the two additives in combination.

The pieces with chloronaphthalenes in combination with iron oxide had higher moduli of rupture and elasticity, higher AD, and much lower dynamic puffing than pieces using only iron oxide showing a synergistic effect for the combination.

EXAMPLE 7

In a test of octachloronaphthalene as an additive, in a relatively medium to coarse mix intended for nipples joining ultra high powered electrodes where high mechanical strength is especially important, the results were as follows:

| EXTRUSION | O | P |
|---|---|---|
| Octachloronaphthalene | control | 1 pph. |
| $Fe_2O_3$, pph | 0.3 | 0.3 |
| AD - Green g/cc | 1.75 | 1.77 |
| AD - Baked g/cc | 1.67 | 1.70 |
| AD 1st Rebake g/cc | 1.77 | 1.76 |
| AD 2nd Rebake g/cc | 1.73 | 1.74 |
| AD Graphitized g/cc | 1.79 | 1.78 |
| ER, Piece, ohm-in × $10^{-5}$ | 21.8 | 22.3 |
| ER, Core, ohm-in × $10^{-5}$ | 24.1 | 24.9 |
| MOR psi | 2170 | 2216 |
| CTE | 6.4 | 7.1 |

The results in this trial were somewhat inconclusive, with the sample showing an improved internal structure as compared to the control but otherwise no significant improvements, and in CTE, slightly poorer performance. It may be concluded that in this particular system no significant advantage was seen from the use of octachloronaphthalene, and that it is best used on a selective basis.

Another effect noted in most instances, is a lowering of the pressure needed to extrude forms of the mix, particularly large electrodes. This effect is synergistic with the action of extrusion lubricant, and allows the binder level to be lowered by 0.5–1.5 pph depending on the type and level of chloro-naphthalene used.

In all of the above the CTE characteristic is determined on a rod extruded from a standard mix of coke and pitch, after baking and graphitizing, and is given as the linear expansion per degree Centigrade over the range of 0° to 50° C. It is an empirical test valid only for comparison and is not an absolute value.

I claim:

1. In a carbon article manufactured by the process of mixing carbonaceous particles selected from the group consisting of calcined needle coke, coal coke, coal tar residue coke, calcined anthracite, graphite, graphitized aggregate and pre-grahitized coke and a carbonaceous binder selected from the group consisting of petroleum pitch, coal tar pitch, phenolic resin, furfural resin and lignosulfonates in a liquid form, shaping the resulting mixture by extrusion or molding to form said article, and baking said article to approximately 800° to 900° C., to carbonize said binder, the improvement comprising employing as an additive to said mixture a material selected from the group consisting of the chlorinated derivatives of naphthalene with from four to eight atoms of chlorine substituted for hydrogen atoms on said naphthalene molecules, known as the tetra, penta, hexa, hepta, and octachloro derivatives of naphthalene or mixtures of same.

2. The article of claim 1 wherein the carbonaceous particles used have a coefficient of thermal expansion characteristic of less than $10 \times 10^{-7}$ cm/cm/° C. over the range of 0° to 50° C.

3. The article of claim 1, wherein said article after baking is further heated to a temperature of approximately 2000° to 3000° C. to convert the carbon in said article to graphite.

4. The article of claim 1 wherein to 100 parts by wt. of carbonaceous particles is added from 0.25 to 5 parts by wt. of chloronaphthalene selected from the group consisting of tetra, penta, hexa, hepta, and octachloronaphthalenes or a mixture of said chloronaphthalenes.

5. The article of claim 1 wherein to 100 parts of the carbonaceous particles on a dry weight basis is added from 0.25 1 to 2 parts by wt. of a puffing inhibitor selected from the group consisting of the oxides of iron, chromium, copper, manganese, calcium, aluminum, titanium, and the alkaline earth fluorides and from 0.25 to 5 parts by wt. of a compound selected from the group consisting of the tetra, penta, hexa, hepta, and octachloronaphthalenes or a mixture of same.

6. The article of claim 5 wherein the puffing inhibitor is selected from the group consisting of the fluorides of calcium, magnesium, strontium and barium, and the oxides of iron, chromium, calcium, manganese, and titanium.

7. The article of claim 6 wherein from 0.25 to 2 parts of iron oxide is added to 100 parts of coke on a dry weight basis.

8. The article of claim 1 wherein the carbonaceous particles have a coefficient of thermal expansion over the range of 0° to 50° C. of less than $5 \times 10^{-7}$ cm/cm/°C.

9. An electrode suitable for use in an ultra high powered electric arc steel furnace manufactured from a mixture comprising needle coke particles having a coefficient of thermal expansion of less than $5 \times 10^{-7}$ cm/cm/° C. over the range of 0° to 50° C., and a coal tar pitch binder, the improvement comprising the use of from 0.25 to 2 parts by wt. of an additive to 100 parts by wt. of said particles, selected from the group consisting of the chlorinated derivatives of naphthalene having four or more chlorine atoms per molecule of naphthalene, the tetra, penta, hexa, hepta, and octachloronaphthalenes or mixtures of said chlorinated derivatives of naphthalene, as a polymerization accelerator for said pitch binder.

* * * * *